United States Patent
Kawakami

(10) Patent No.: US 11,787,823 B2
(45) Date of Patent: Oct. 17, 2023

(54) DITERMINALLY SILANOL-MODIFIED PERFLUOROPOLYETHER COMPOUND AND PREPARATION THEREOF

(71) Applicant: Shin-Etsu Chemical Co., Ltd., Tokyo (JP)

(72) Inventor: Masato Kawakami, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/389,988

(22) Filed: Jul. 30, 2021

(65) Prior Publication Data

US 2022/0033422 A1 Feb. 3, 2022

(30) Foreign Application Priority Data

Aug. 3, 2020 (JP) ................................. 2020-131626

(51) Int. Cl.
*C07F 7/08* (2006.01)

(52) U.S. Cl.
CPC .......... *C07F 7/0838* (2013.01); *C07F 7/0878* (2013.01)

(58) Field of Classification Search
CPC .... C08G 65/007; C08G 65/336; C07F 7/0878
See application file for complete search history.

(56) References Cited

U.S. PATENT DOCUMENTS

| | | | |
|---|---|---|---|
| 2005/0194588 A1 | 9/2005 | Sasaki et al. | |
| 2021/0189072 A1* | 6/2021 | Honda | ................. C08K 5/5419 |

FOREIGN PATENT DOCUMENTS

| | | | | |
|---|---|---|---|---|
| JP | 2005-200304 A | 7/2005 | | |
| WO | WO 2019088126 A1 * | 5/2019 | ............ | C08L 71/100 |

* cited by examiner

*Primary Examiner* — Pancham Bakshi
(74) *Attorney, Agent, or Firm* — BIRCH, STEWART, KOLASCH & BIRCH, LLP

(57) ABSTRACT

Diterminally silanol-modified perfluoropolyether compounds of the general formula (1)

(1)

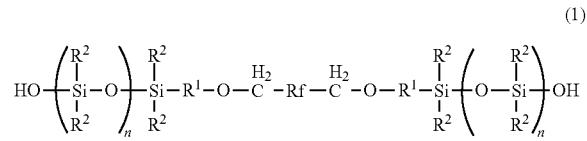

(wherein each $R^1$ is independently an unsubstituted divalent hydrocarbon group of 1 to 10 carbon atoms, each $R^2$ is independently a substituted or unsubstituted monovalent hydrocarbon group of 1 to 10 carbon atoms, Rf is a perfluoropolyether group, and 'n' is independently at each occurrence an integer from 0 to 8) are provided. Such compounds, when reacted as an intermediate with a reactive silicon compound, afford compounds of excellent durability.

4 Claims, 4 Drawing Sheets

DITERMINALLY SILANOL-MODIFIED PERFLUOROPOLYETHER COMPOUND AND PREPARATION THEREOF

CROSS-REFERENCE TO RELATED APPLICATION

This non-provisional application claims priority under 35 U.S.C. § 119(a) on Patent Application No. 2020-131626 filed in Japan on Aug. 3, 2020, the entire contents of which are hereby incorporated by reference.

TECHNICAL FIELD

The present invention relates to a diterminally silanol-modified perfluoropolyether compound and to a method for preparing the same.

BACKGROUND ART

Perfluoropolyether groups are building blocks containing a large number of fluorine atoms. Compounds having such a perfluoropolyether group (which compounds are referred to below as "perfluoropolyether compounds"), and coating films and articles obtained from compositions containing such compounds, have a very small surface free energy due to the effect of the many fluorine atoms included on the perfluoropolyether group, and thus exhibit, for example, water and oil repellency, lubricity, releasability and stain-blocking properties. Because of this quality, perfluoropolyether compounds are employed in a broad range of fields, including water and oil repellent finishes, lubricants, oil proofing agents, cosmetics and protective films.

Perfluoropolyether compounds having functional groups at the ends of the main chain can be used to derive polymers having a perfluoropolyether skeleton by way of copolymerization with a reactive monomer or via reaction with a reactive resin. This makes it possible to impart, in addition to the properties of the polymer itself, the foregoing properties of perfluoropolyether groups. Perfluoropolyether compounds having functional groups such as (meth)acrylate, amine, alcohol, isocyanate, epoxy, thiol and vinyl groups and halogen atoms have been developed to date as such perfluoropolyether compounds.

For example, JP-A 2005-200304 teaches the preparation of a perfluoropolyether compound having a functional group from a silane coupling agent by carrying out transesterification between, as the starting materials, a perfluoropolyether compound having a terminal C—OH structure and a silane coupling agent having a reactive group and thus linking the perfluoropolyether compound with the silane coupling agent through a C—O—Si bond.

However, in the presence of moisture or alcohol, the C—O—Si bonds in such prior-art perfluoropolyether compounds break down to C—OH and RO—Si (R here being a hydrogen atom or a hydrocarbon group), leading to problems with durability.

SUMMARY OF THE INVENTION

It is therefore an object of the present invention to provide a diterminally silanol-modified perfluoropolyether compound which, when reacted with a reactive silicon compound, is capable of yielding a compound of excellent durability. Another object is to provide a method for preparing such a diterminally silanol-modified perfluoropolyether compound.

As a result of extensive investigations, I have discovered that because functional groups can easily be introduced onto a diterminally silanol-modified perfluoropolyether compound having silanol groups at both ends and a perfluoropolyether group as the main chain when it is combined with a silicon compound, such a perfluoropolyether compound can serve as a useful synthetic intermediate. In particular, combination with a reactive silicon compound enables the perfluoropolyether compound and the reactive silicon compound to be joined by Si—O—Si bonds (siloxane bonds), resulting in a product that exhibits a durability superior to that of prior-art compounds.

Accordingly, one aspect of the invention is directed at a diterminally silanol-modified perfluoropolyether compound of general formula (1) below (1)

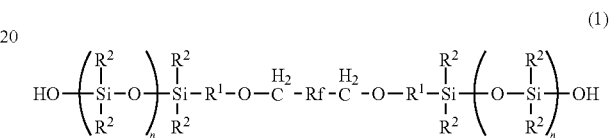

(wherein each $R^1$ is independently an unsubstituted divalent hydrocarbon group of 1 to 10 carbon atoms, each $R^2$ is independently a substituted or unsubstituted monovalent hydrocarbon group of i to 10 carbon atoms, Rf is a perfluoropolyether group, and the subscript 'n' is independently at each occurrence an integer from 0 to 8). In this compound, it is preferable for each $R^1$ to be independently a group of formula (4) or (5) below.

(4)

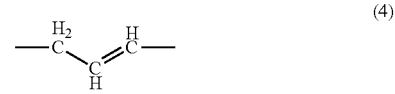

(5)

Also, Rf is preferably a divalent group of any one of general formulas (6) to (9) below (6)

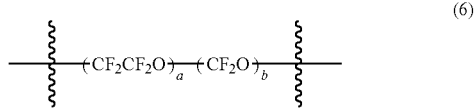

(7)

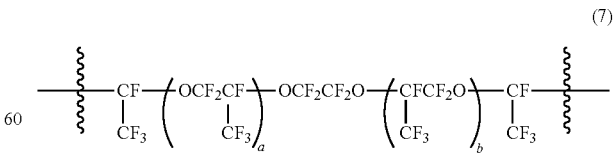

(8)

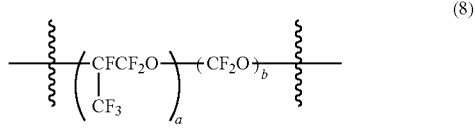

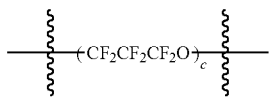

(9)

(wherein 'a' and 'b' are each independently an integer from 1 to 50, and 'c' is an integer from 1 to 150).

A second aspect of the invention is directed at a method for preparing the diterminally silanol-modified perfluoropolyether compound of the first aspect of the invention, which method includes the step of reacting a perfluoropolyether compound of general formula (2) below having unsaturated bonds at both ends

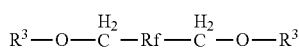

(2)

(wherein each $R^3$ is independently an unsubstituted monovalent hydrocarbon group of 2 to 10 carbon atoms that has a terminal unsaturated bond, and Rf is as defined above) with a silanol group-containing hydrosilane compound of general formula (3) below

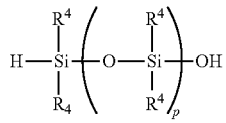

(3)

(wherein each $R^4$ is independently a substituted or unsubstituted monovalent hydrocarbon group of 1 to 10 carbon atoms, and 'p' is an integer from 0 to 8) in the presence of a platinum catalyst.

Advantageous Effects of the Invention

The diterminally silanol-modified perfluoropolyether compound of the invention can be used as a synthesis intermediate. In particular, when reacted with a reactive silicon compound, a compound that is highly durable to alcohol and water can be obtained.

BRIEF DESCRIPTION OF THE DIAGRAMS

DESCRIPTION OF THE PREFERRED EMBODIMENTS

Figure 1:
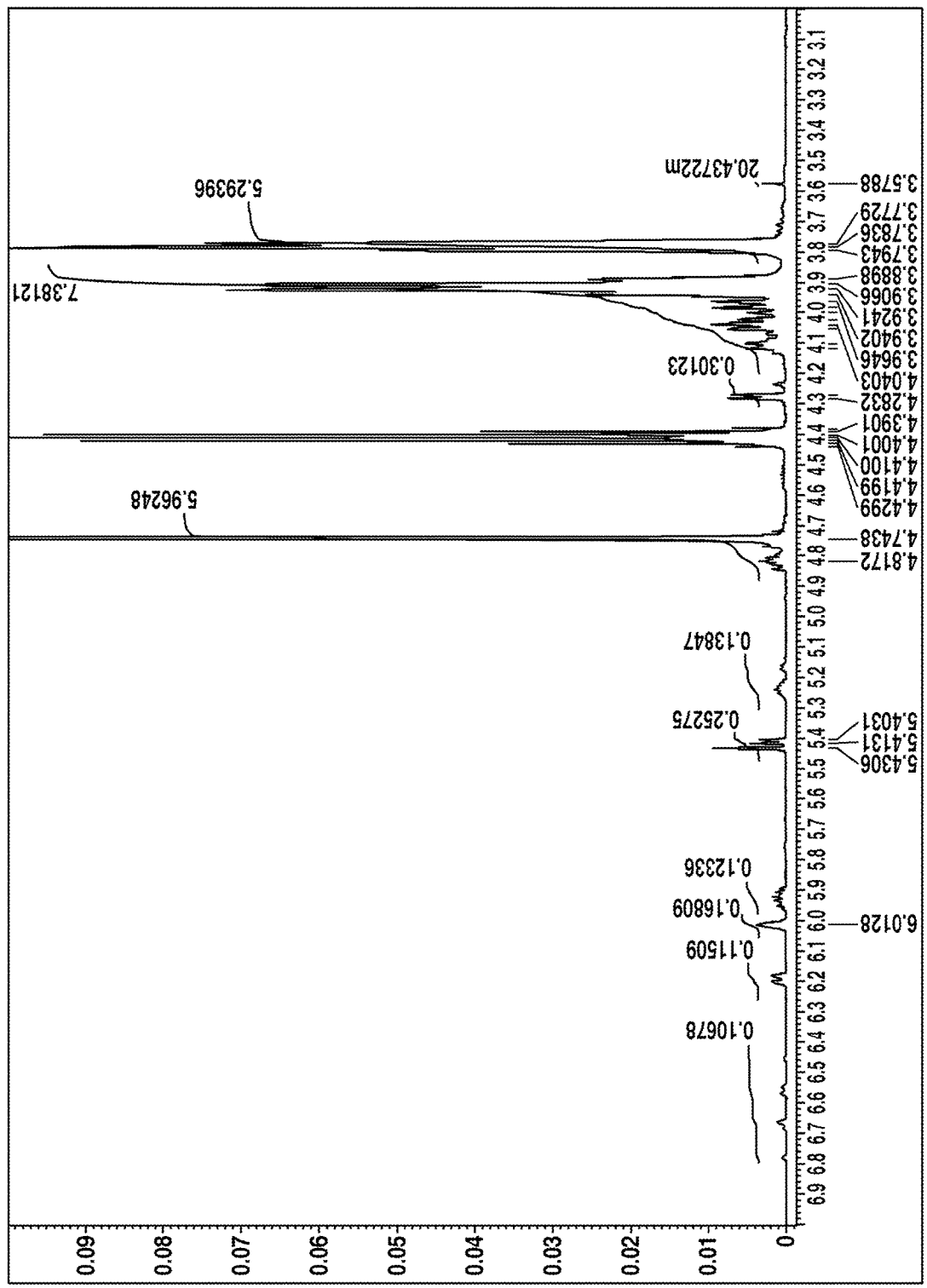
FIG. 1 is an $^1$H-NMR spectrum of Diterminally Silanol-Modified Perfluoropolyether Compound 1 obtained in Example 1.

The objects, features and advantages of the invention will become more apparent from the following detailed description taken in conjunction with the appended diagrams.

The diterminally silanol-modified perfluoropolyether compound according to the invention (referred to below as "Compound (1)") is represented by general formula (1) below.

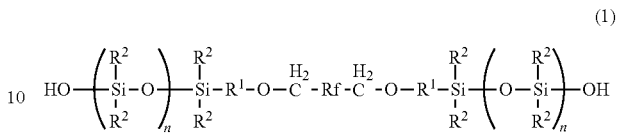

(1)

In general formula (1) and below, Rf stands for a perfluoropolyether group. The perfluoropolyether group is exemplified by, without particular limitation, the divalent groups of general formulas (6) to (9) below.

(6)

(7)

(8)

(9)

In general formulas (6) to (8), 'a' and 'b' are each independently an integer from 1 to 50, and preferably an integer from 15 to 40. Also, the sum of 'a' and 'b' is such that 2≤a+b≤100, preferably 2≤a+b≤80, more preferably 10≤a+b≤80, even more preferably 30≤a+b≤80, and still more preferably 15≤a+b≤50.

In general formula (9), 'c' is an integer from 1 to 150, preferably from 1 to 100, and more preferably from 5 to 80.

In general formula (1), each $R^1$ is independently an unsubstituted divalent hydrocarbon group of 1 to 10, preferably 1 to 6, and more preferably 1 to 3, carbon atoms.

Illustrative examples of the divalent hydrocarbon groups represented by $R^1$ include linear alkylene groups such as methylene, ethylene, trimethylene, tetramethylene, hexamethylene, octamethylene and decylene groups; branched alkylene groups such as methylethylene and methyltrimethylene groups; cyclic alkylene groups such as cyclohexylene and methylenecyclohexylenemethylene groups; linear alkenylene groups such as propenylene, butenylene, hexenylene and octenylene groups; branched alkenylene groups such as isopropenylene and isobutenylene groups; arylene groups such as the phenylene group; and aralkylene groups such as methylenephenylene and methylenephenylenemethylene groups.

Of these, from the standpoint of the ease of procuring the starting materials, linear alkylene groups, linear alkenylene groups or branched alkenylene groups are preferred.

The divalent hydrocarbon groups represented by $R^1$ are more preferably groups of formula (4) or (5) below. Compound (1) may be a mixture in which these substituents are combined.

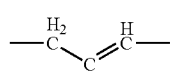
(4)

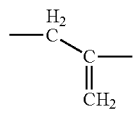
(5)

Each $R^2$ is independently a substituted or unsubstituted monovalent hydrocarbon group of 1 to 10, preferably 1 to 6, and more preferably 1 to 3, carbon atoms.

Illustrative examples of the monovalent hydrocarbon groups represented by $R^2$ include linear alkyl groups such as methyl, ethyl, n-propyl, n-butyl, n-pentyl, n-hexyl, n-heptyl, n-octyl and decyl groups; branched-chain alkyl groups such as isopropyl, isobutyl, sec-butyl, tert-butyl, neopentyl, decyl and 2-ethylhexyl groups; cyclic alkyl groups such as cyclopentyl and cyclohexyl groups; alkenyl groups such as vinyl, allyl, propenyl, butenyl and pentenyl groups; aryl groups such as phenyl and tolyl groups; and aralkyl groups such as benzyl and phenethyl groups.

Some or all hydrogen atoms on the monovalent hydrocarbon groups represented by $R^2$ may be substituted with fluorine atoms. Illustrative examples of fluorine-substituted monovalent hydrocarbon groups include fluoroalkyl groups such as (3,3,3-trifluoro)propyl, (3,3,4,4,5,5,6,6,6-nonafluoro)hexyl and (3,3,4,4,5,5,6,6,7,7,8,8,8-tridecafluoro)octyl groups.

In general formula (1), the subscript 'n' is independently at each occurrence an integer from 0 to 8, preferably from 1 to 7, and more preferably from 1 to 3.

When the divalent hydrocarbon groups represented by $R^1$ are a mixture in which substituents of formula (4) and (5) are combined, the mixing ratio therebetween can be expressed as the ratio between terminal addition and internal addition. That is, letting "terminal addition" refer to compounds in which silicon is bonded at the terminal carbon on $R^1$ in Compound (1) and "internal addition" refer to compounds in which silicon is bonded at a carbon one or more places in from the end of $R^1$, the proportions of each can be determined by $^1$H-NMR spectroscopy.

The ratio between terminal addition and internal addition, from the standpoint of the stability of the product, is preferably from 10:1 to 1:1, and more preferably from 5:1 to 2:1.

Illustrative examples of Compound (1) include the following compounds.

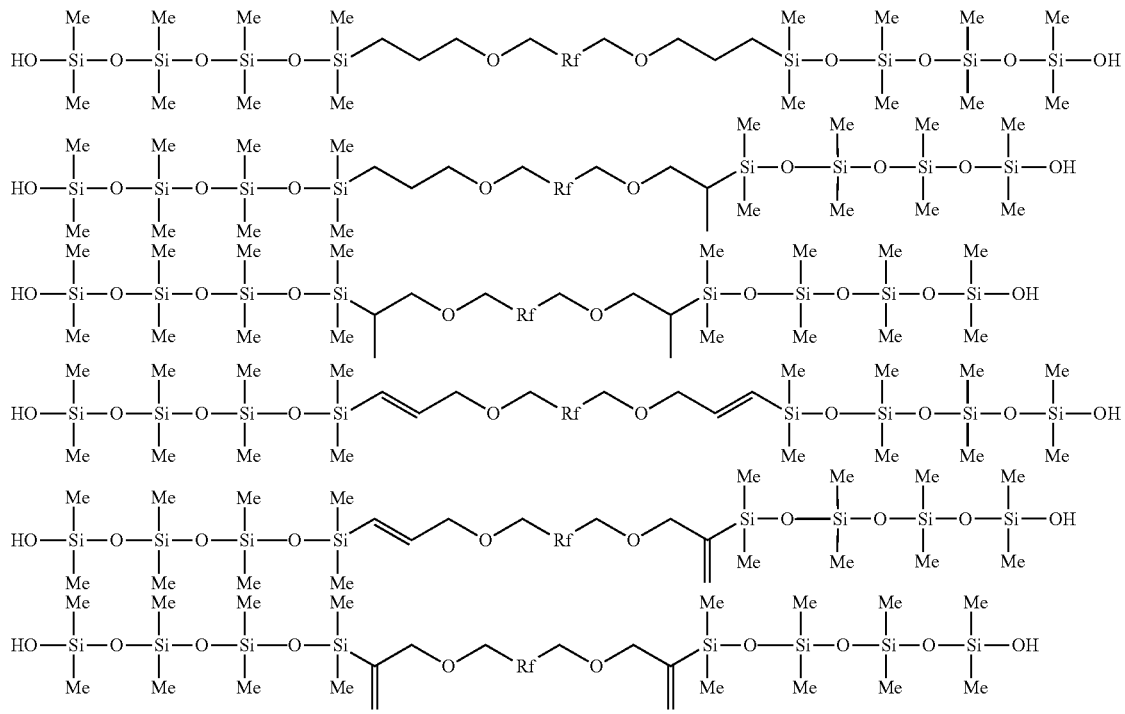

(wherein "Me" represents a methyl group, the same applies hereinafter)

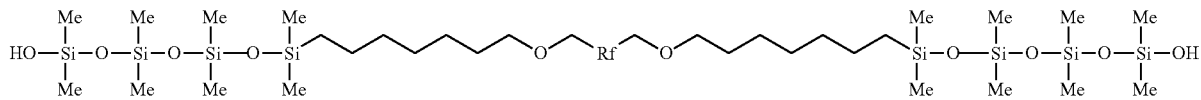

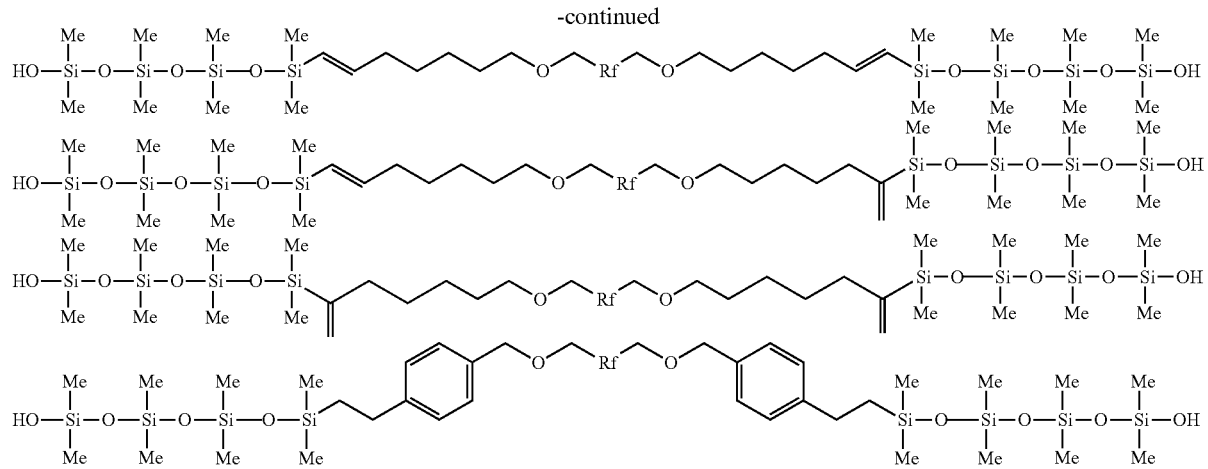

Next, the method of preparing Compound (1) is described.

Compound (1) of the invention can be obtained by, for example, reacting a perfluoropolyether compound of general formula (2) having unsaturated bonds at both ends (referred to below as "Compound (2)") with a silanol group-containing hydrosilane compound of general formula (3) below (referred to below as "Compound (3)") in the presence of a platinum catalyst.

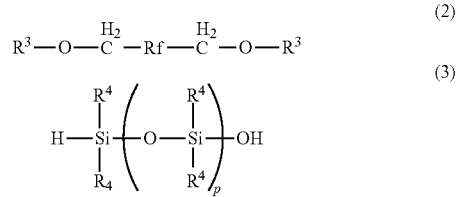

(wherein Rf is as defined above)

In general formula (2), each $R^3$ is independently a monovalent hydrocarbon group of 2 to 10, preferably 3 to 8, carbon atoms which has an unsaturated bond at the end.

Illustrative examples of the monovalent hydrocarbon group represented by $R^3$ include alkenyl groups such as vinyl, allyl (propenyl), butenyl, pentenyl, hexenyl, octenyl and decenyl groups; the phenylenevinyl group; and alkynyl groups such as ethynyl and propargyl groups.

In particular, to achieve a high conversion ratio for the reaction, alkenyl groups of 4 to 8 carbons and alkynyl groups of 3 to 8 carbons are preferred.

Illustrative examples of Compound (2) include the following compounds.

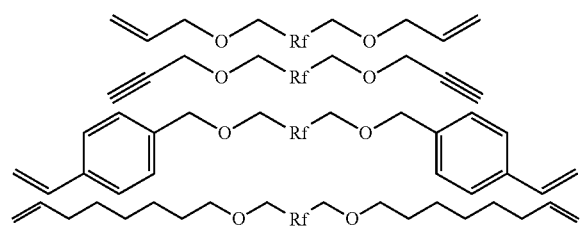

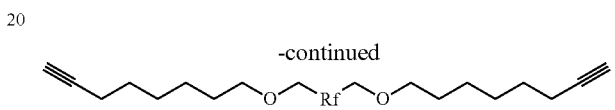

Compound (2) can be obtained by Williams etherification of a dialcohol-terminated perfluoropolyether. For example, Compound (2) can be obtained by reacting a dialcohol-terminated perfluoropolyether compound with an alkali metal or alkaline earth metal hydroxide or hydride to prepare a metal alcoholate, and subsequently reacting this with a halogenated hydrocarbon compound.

In general formula (3), each $R^4$ is independently a substituted or unsubstituted monovalent hydrocarbon group of 1 to 10, and preferably 1 to 6, carbon atoms. This monovalent hydrocarbon group is exemplified by the same substituents as $R^2$.

The subscript 'p' is an integer from 0 to 8, preferably from 1 to 7, more preferably from 1 to 5, and even more preferably from 1 to 3.

Illustrative examples of Compound (3) include hydroxydimethylsilane, 1-hydroxy-1,1,3,3-tetramethyldisiloxane, 1-hydroxy-1,1,3,3,5,5-hexamethyltrisiloxane, 1-hydroxy-1,1,3,3,5,5,7,7-octamethyltetrasiloxane and 1-hydroxy-1,1,3,3,5,5,7,7,9,9,11,11,13,13-tetradecamethylheptasiloxane.

The compounding ratio between Compound (2) and Compound (3) is not particularly limited, although the amount of Compound (3) per mole of unsaturated groups in Compound (2) is preferably from 1 to 2 moles, more preferably from 1 to 1.2 moles, and even more preferably from 1 to 1.05 moles.

A platinum compound is used as the catalyst in the reaction between Compound (2) and Compound (3). Illustrative examples of this platinum catalyst include chloroplatinic acid, alcohol solutions of chloroplatinic acid, toluene or xylene solutions of a platinum-1,3-divinyl-1,1,3,3-tetramethyldisiloxane complex, tetrakis(triphenylphosphine)platinum, dichlorobis(triphenylphosphine)platinum, dichlorobis(acetonitrile)platinum, dichlorobis(benzonitrile)platinum, dichloro(cyclooctadiene)platinum and platinum-activated carbon.

The platinum compound is used in an amount which is not particularly limited. However, in terms of productivity, the amount is preferably from 0.000001 to 0.2 mole, and more preferably from 0.00001 to 0.1 mole, per mole of the unsaturated bonds included in Compound (2).

The reaction temperature is not particularly limited. However, from the standpoint of the stability of the product, the temperature is preferably between 0 and 200° C., and more preferably between 20 and 150° C. The reaction time also is not particularly limited but, from the standpoint of the stability of the product, is preferably from 1 to 40 hours, and more preferably from 1 to 20 hours.

To prevent catalyst deactivation, the above reaction is preferably carried out in an inert gas atmosphere, such as nitrogen or argon.

This reaction proceeds even in the absence of a solvent, although a solvent may be used. Illustrative examples of the solvent include aliphatic hydrocarbon solvents of 5 to 20 carbons, such as pentane, hexane, cyclohexane, heptane, octane, nonane, decane, isooctane and isododecane; aromatic hydrocarbon solvents of 6 to 10 carbons such as benzene, toluene and xylene; ether solvents such as diethyl ether, tetrahydrofuran, dioxane and dipropylene glycol dimethyl ether; ester solvents such as ethyl acetate and butyl acetate; aprotic polar solvents such as acetonitrile, N,N-dimethylformamide and N-methylpyrrolidone; silicone solvents such as hexamethyldisiloxane, octamethyltrisiloxane, decamethyltetrasiloxane, tris(trimethylsiloxy)methylsilane, octamethylcyclotetrasiloxane and decamethylcyclopentasiloxane; and fluorocarbon solvents such as hexafluorobenzene, trifluoromethybenzene, hexafluoro-m-xylene, nonafluorobutyl methyl ether, nonafluorobutyl ethyl ether and tridecafluorohexyl methyl ether. These solvents may be of one type used alone, or two or more may be used in admixture. Fluorocarbon solvents are especially preferred for resolving compatibility problems between Compound (2) and Compound (3).

Compound (1) obtained from the above reaction can be isolated and purified by suitably selecting and using a method of purification commonly employed in organic synthesis, such as vacuum stripping, any of various chromatographic techniques, treatment using an adsorbent such as activated carbon, and filtration. In particular, to remove or reduce the amount of platinum compound used in the reaction and improve the hue of the product, treatment using an adsorbent is preferred. Following treatment with an adsorbent, it is preferable to remove the adsorbent by filtration.

The silanol insertion percentage in Compound (1) is not particularly limited. However, for a higher compatibility with the other compound and the solvent, it is preferably from 50 to 100%, more preferably from 70 to 100%, and even more preferably from 85 to 100%.

The "silanol insertion percentage" used herein is computed as follows:

Silanol insertion percentage=Compound (1) abundance ratio/(Compound (1) abundance ratio+ Compound (2) abundance ratio)×100

The silanol insertion percentage can be obtained by, for example, measurement of the $^1$H-NMR spectra for Compounds (1) and (2) and calculation from the peak integration ratio.

Because Compound (1) prepared in the above manner has silanol groups with abundant reactivity, derivatization by various conversion reactions can be carried out. Examples include dehydrochlorination condensation with a chlorosilane compound (Cl—Si), dealcoholation condensation with an alkoxysilane compound or the partial hydrolysate of an alkoxysilane compound (RO—Si, where R is a hydrocarbon group), dehydrative condensation of a silanol compound (HO—Si), and deammoniation or deamination condensation with a silazane compound (N—Si).

EXAMPLES

The following Synthesis Examples, Inventive Examples and Application Examples are provided to illustrate the invention, but are not intended to limit the scope thereof.

Synthesis Example 1

Synthesis of Diterminally Unsaturated Perfluoropolyether Compound 1

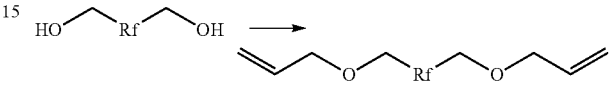

The interior of a four-neck glass flask equipped with a stirrer, a thermometer and a reflux condenser was flushed with nitrogen, charged with 186.4 g of a dialcohol-terminated perfluoropolyether (OH equivalent, 0.2000 mol; Fomblin D2, from Solvay Specialty Polymers; this being a compound having a substituent of general formula (6) above in which a=8 to 9 and b=8 to 9), 83.5 g (1.00 mol) of a 48 wt % aqueous solution of sodium hydroxide and 50 g of water, and the flask contents were stirred at room temperature for one hour. The resulting reaction mixture was heated to 60° C. and 73.0 g (0.613 mol) of allyl bromide was added dropwise over 20 minutes, following which stirring was carried out at the same temperature for 6 hours. The reaction mixture was then cooled, 200 g of water and 100 g of m-xylene hexafluoride (MXHF) were added, and the system was stirred at room temperature for one hour. At this point, the reaction mixture separated into two phases. The bottom phase was washed with 200 g of a 5 wt % aqueous solution of acetic acid. The solvent was removed from the resulting bottom phase, giving 183 g of Diterminally Unsaturated Perfluoropolyether Compound 1.

Synthesis Example 2

Synthesis of Diterminally Unsaturated Perfluoropolyether Compound 2

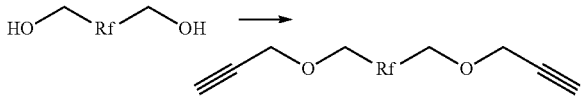

The interior of a four-neck glass flask equipped with a stirrer, a thermometer and a reflux condenser was flushed with nitrogen, charged with 394.3 g of a dialcohol-terminated perfluoropolyether (OH equivalent, 0.4231 mol, Fomblin D2, from Solvay Specialty Polymers), 176.2 g (2.114 mol) of a 48 wt % aqueous solution of sodium hydroxide and 106 g of water, and the flask contents were stirred at 60° C. for one hour. Next, 151.3 g (1.269 mol) of propargyl bromide was added dropwise at the same temperature over 30 minutes, following which stirring was carried out at the same temperature for 6 hours. The reaction mixture was then cooled, 432 g of water and 216 g of MXHF were added, and the system was stirred at room temperature for one hour. At this point, the reaction mixture separated into two phases. The bottom phase was washed with 430 g of 5 wt % hydrochloric acid. The solvent was removed from the resulting bottom phase, giving 372 g of Diterminally Unsaturated Perfluoropolyether Compound 2.

Inventive Example 1

Synthesis of Diterminally Silanol-Modified Perfluoropolyether Compound 1

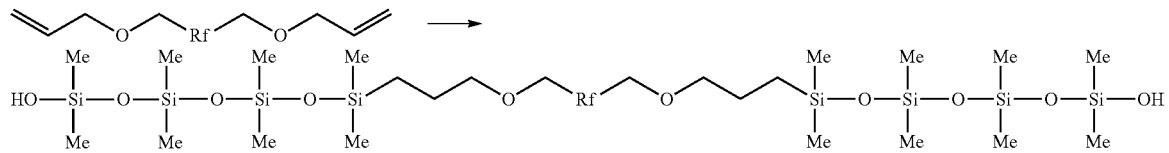

Figure 2:
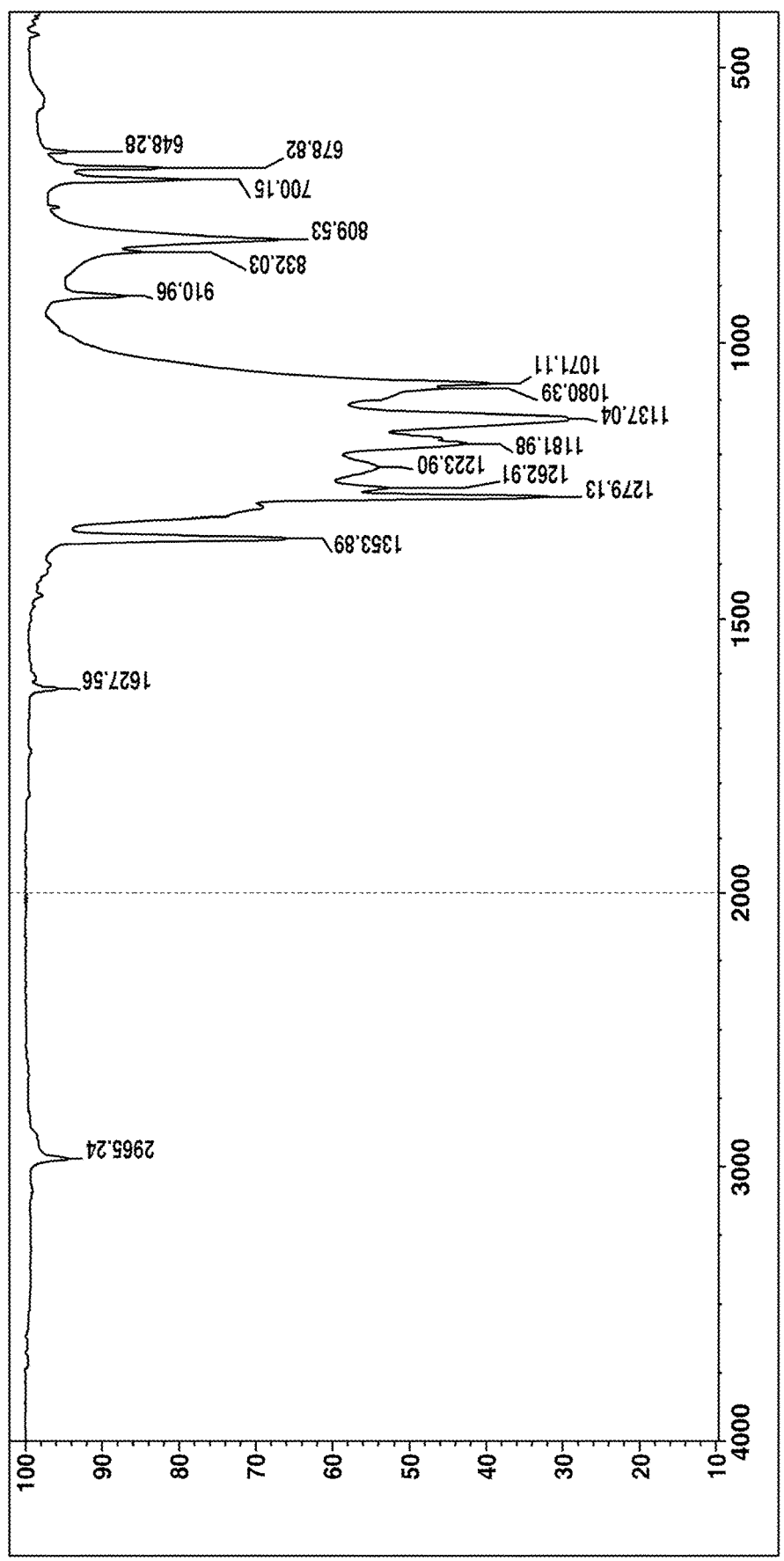
FIG. 2 is an IR spectrum of Diterminally Silanol-Modified Perfluoropolyether Compound 1 obtained in Example 1.

The interior of a four-neck glass flask equipped with a stirrer, a thermometer and a reflux condenser was flushed with nitrogen, charged with 19.7 g of Diterminally Unsaturated Perfluoropolyether Compound 1 obtained in Synthesis Example 1 (corresponding to 0.01 mol of unsaturated bonds), 9.7 g of MXHF and 0.010 g of a 3 wt % toluene solution of platinum-1,3-divinyltetramethyldisiloxane complex (platinum basis, 0.0000015 mol), and the flask contents were heated to 60° C. After the internal temperature had stabilized, a mixture of 3.1 g (0.0102 mol) of 1-hydroxy-1,1,3,3,5,5,7,7-octamethyltetrasiloxane and 3.1 g of MXHF was added dropwise over one hour and the system was stirred at the same temperature for 2 hours. The $^1$H-NMR and IR spectra of the reaction mixture were measured at this point (see FIGS. 1 and 2). In the $^1$H-NMR spectrum, the peaks near 5.0-6.0 ppm attributable to the double bonds decreased and methylene peaks near 0.5-1.6 ppm that arose as the reaction proceeded were observed. The silanol insertion percentage calculated from the peak integration ratio was 82%.

These results confirmed the formation of Diterminally Silanol-Modified Perfluoropolyether Compound 1, and 24.6 g of a MXHF solution containing Diterminally Silanol-Modified Perfluoropolyether Compound 1 was obtained.

Inventive Example 2

Synthesis of Diterminally Silanol-Modified Perfluoropolyether Compound 2

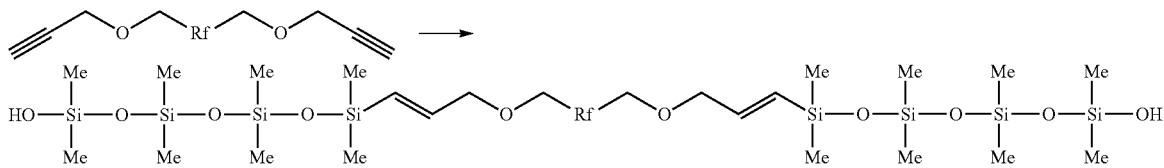

Figure 3:
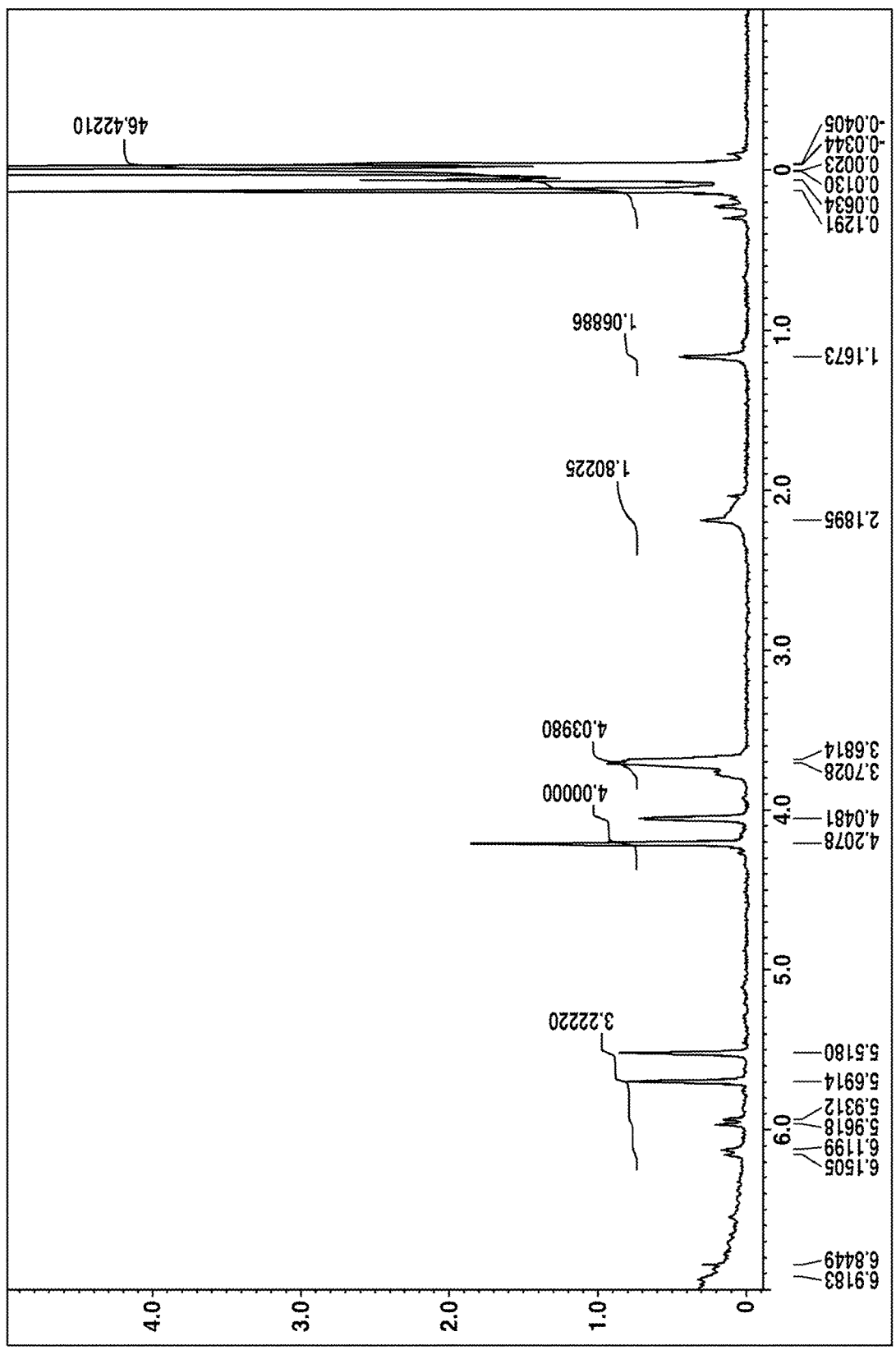
FIG. 3 is an $^1$H-NMR spectrum of Diterminally Silanol-Modified Perfluoropolyether Compound 2 obtained in Example 2.
Figure 4:
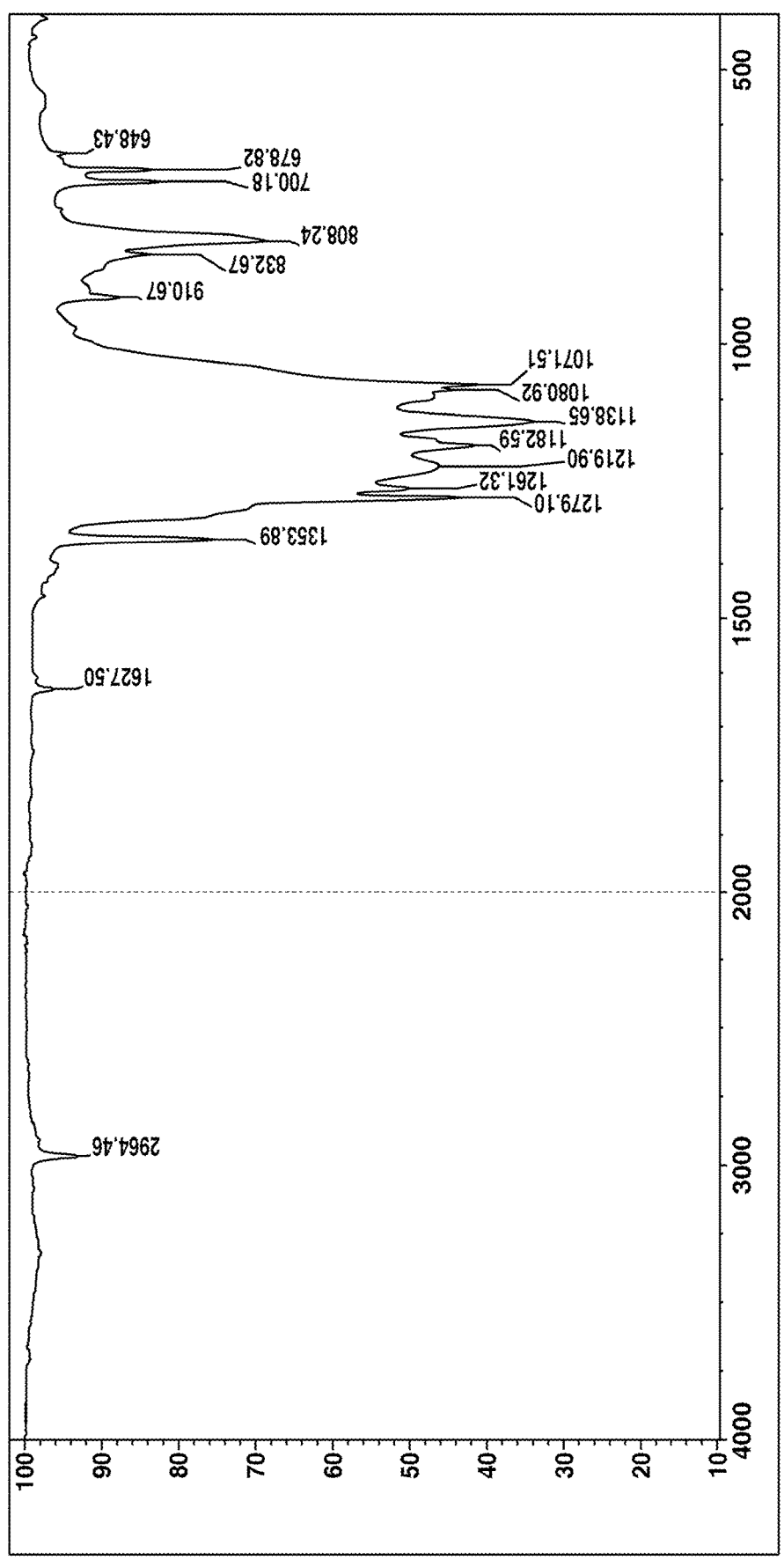
FIG. 4 is an IR spectrum of Diterminally Silanol-Modified Perfluoropolyether Compound 2 obtained in Example 2.

The interior of a four-neck glass flask equipped with a stirrer, a thermometer and a reflux condenser was flushed with nitrogen, charged with 97.0 g of Diterminally Unsaturated Perfluoropolyether Compound 2 obtained in Synthesis Example 2 (corresponding to 0.1 mol of unsaturated bonds), 97.0 g of MXHF and 0.13 g of a 3 wt % toluene solution of platinum-1,3-divinyltetramethyldisiloxane complex (platinum basis, 0.000020 mol), and the flask contents were heated to 80° C. After the internal temperature had stabilized, a mixture of 30.5 g (0.102 mol) of 1-hydroxy-1,1,3,3,5,5,7,7-octamethyltetrasiloxane and 30.5 g of MXHF was added dropwise over 8 hours and the system was stirred at the same temperature for 1 hour. The $^1$H-NMR and IR spectra of the reaction mixture were measured at this point (see FIGS. 3 and 4). In the $^1$H-NMR spectrum, the peaks near 2.1 ppm attributable to the terminal alkynes vanished and peaks attributable to double bonds that arose at 5.5-6.2 ppm were observed. The silanol insertion percentage was calculated from the peak integration ratio and found to be 100%. In the IR spectrum as well, the alkyne peak (3320 cm$^{-1}$) vanished.

These results confirmed the formation of Diterminally Silanol-Modified Perfluoropolyether Compound 2, and 252 g of a MXHF solution containing Diterminally Silanol-Modified Perfluoropolyether Compound 2 was obtained. The ratio of terminal addition to internal addition was 3.2:1.

Application Example 1

Use of Diterminally Silanol-Modified Perfluoropolyether Compound 2 as an Intermediate

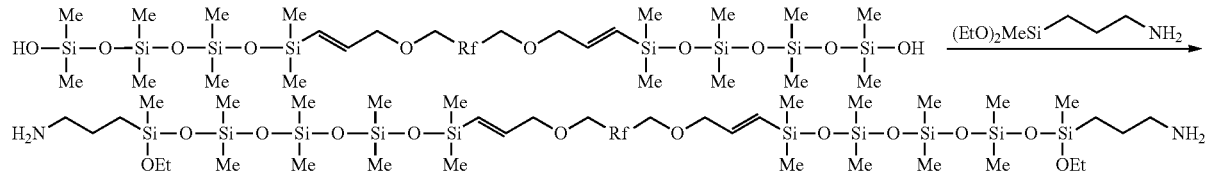

(wherein "Et" stands for an ethyl group)

The interior of a four-neck glass flask equipped with a stirrer, a thermometer and a reflux condenser was flushed with nitrogen and charged with 28.4 g of the MXHF solution containing Diterminally Silanol-Modified Perfluoropolyether Compound 2 obtained in Example 2. To this was added 2.10 g (0.0110 mol) of 3-aminopropylmethyldiethoxysilane, and the flask contents were stirred at room temperature for 30 minutes. The resulting reaction mixture was heated to 150° C., and the MXHF and ethanol were drawn off. The remaining MXHF, ethanol and 3-aminopropylmethyldiethoxysilane were then removed under reduced pressure, giving 15.2 g of Aminated Perfluoropolyether Compound 1.

Next, 0.5 g of Aminated Perfluoropolyether Compound 1, 5.0 g of ethanol and 0.5 g of 4-methyltetrahydropyran as an internal standard were mixed together and then stirred at room temperature for 24 hours. The reaction mixture was subjected to gas chromatographic analysis, whereupon the decomposition product 3-aminopropylmethyldiethoxysilane was not detected; only ethanol and 4-methyltetrahydropyran peaks were observed.

These results demonstrate that a derivative obtained using a diterminally silanol-modified perfluoropolyether compound as the starting material does not decompose even in the presence of a large amount of alcohol. One would thus expect the derivative, even when used to prepare a polymer or added to a resin, to exhibit a high alcohol resistance.

Japanese Patent Application No. 2020-131626 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A diterminally silanol-modified perfluoropolyether compound of general formula (1) below

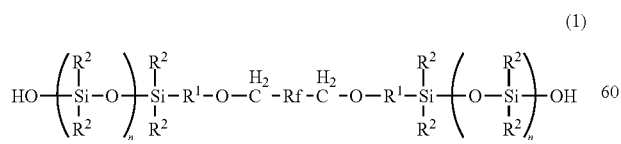

(1)

wherein each $R^1$ is independently an unsubstituted linear alkenylene group or a branched alkenylene group of 2 to 10 carbon atoms, each $R^2$ is independently a substituted or unsubstituted monovalent hydrocarbon group of 1 to 10 carbon atoms, Rf is a perfluoropolyether group, and the subscript 'n' is independently at each occurrence an integer from 1 to 7.

2. The perfluoropolyether compound of claim 1, wherein each $R^1$ is independently a group of formula (4) or (5) below

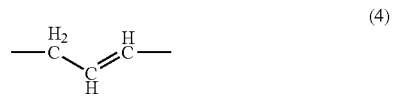

(4)

(5)

3. The perfluoropolyether compound of claim 1, wherein Rf is a divalent group of any one general formulas (6) to (9) below

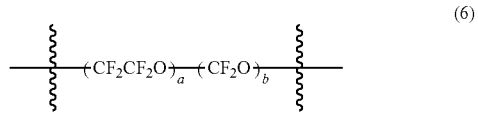

(6)

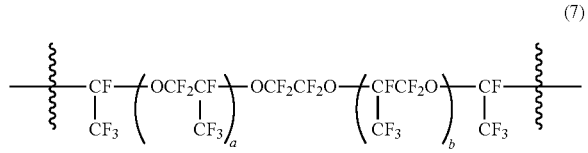

(7)

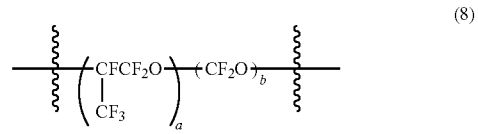

(8)

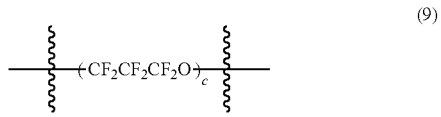

(9)

wherein 'a' and 'b' are each independently an integer from 1 to 50, and 'c' is an integer from 1 to 150.

4. A method for preparing the diterminally silanol-modified perfluoropolyether compound of general formula (1) below:

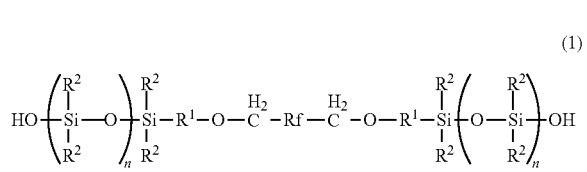 (1)

wherein each $R^1$ is independently an unsubstituted divalent hydrocarbon group of 1 to 10 carbon atoms, each $R^2$ is independently a substituted or unsubstituted monovalent hydrocarbon group of 1 to 10 carbon atoms, Rf is a perfluoropolyether group, and the subscript 'n' is independently at each occurrence an integer from 0 to 8, comprising reacting a perfluoropolyether compound of general formula (2) below having unsaturated bonds at both ends;

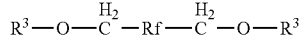 (2)

wherein each $R^3$ is independently an unsubstituted monovalent hydrocarbon group of 2 to 10 carbon atoms that has a terminal unsaturated bond, and Rf is as defined above; with a silanol group-containing hydrosilane compound of general formula (3) below

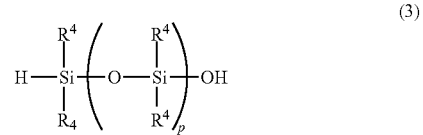 (3)

wherein each $R^4$ is independently a substituted or unsubstituted monovalent hydrocarbon group of 1 to 10 carbon atoms, and 'p' is an integer from 0 to 8 in the presence of a platinum catalyst.

\* \* \* \* \*